M. LANGE.
OPTICAL SYSTEM OF VARIABLE MAGNIFICATION.
APPLICATION FILED NOV. 14, 1914.
1,236,722.
Patented Aug. 14, 1917.
2 SHEETS—SHEET 1.
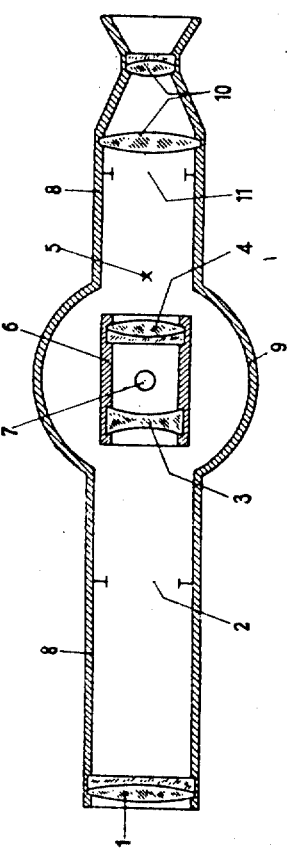
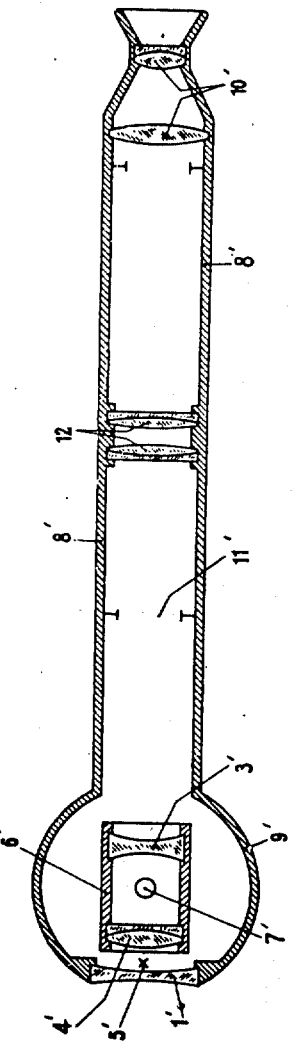

M. LANGE.
OPTICAL SYSTEM OF VARIABLE MAGNIFICATION.
APPLICATION FILED NOV. 14, 1914.
1,236,722.
Patented Aug. 14, 1917.
2 SHEETS—SHEET 2.
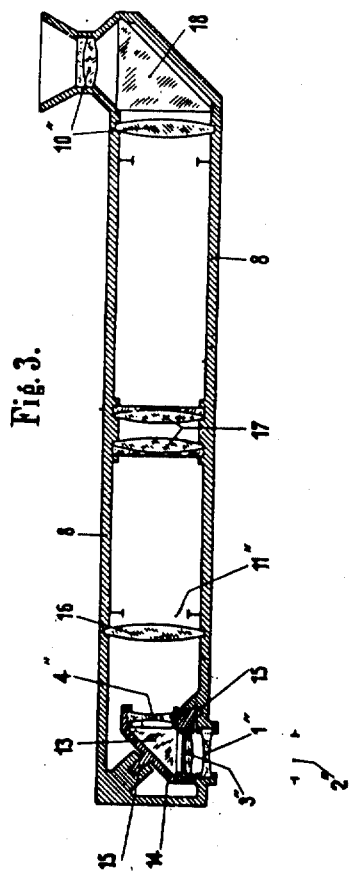
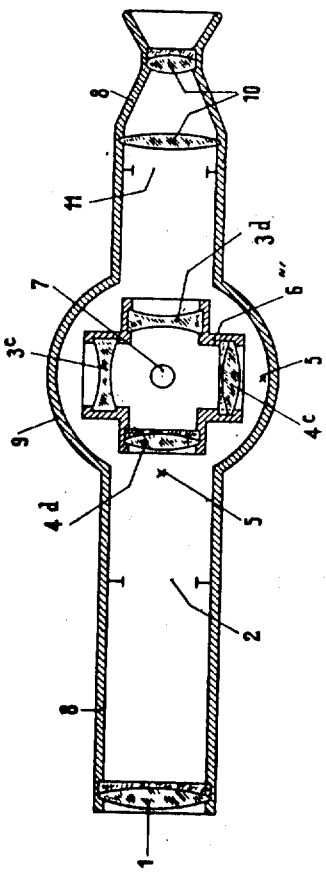
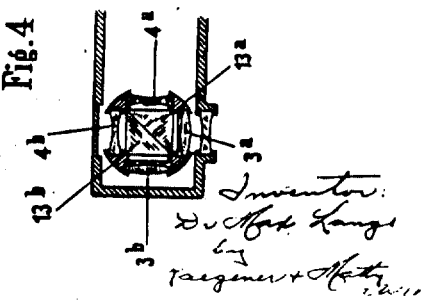

UNITED STATES PATENT OFFICE.

MAX LANGE, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

OPTICAL SYSTEM OF VARIABLE MAGNIFICATION.

1,236,722.  Specification of Letters Patent.  Patented Aug. 14, 1917.

Application filed November 14, 1914. Serial No. 872,203.

*To all whom it may concern:*

Be it known that I, Dr. MAX LANGE, a citizen of the German Empire, and resident of Steglitz, near Berlin, Germany, have invented certain new and useful Improvements in Optical Systems of Variable Magnification, of which the following is a specification.

This invention relates to an optical system with reversible lens system consisting at least of two parts for varying or changing the magnification. The invention has for its object in optical systems of this kind to enable a great variation of magnification in connection with favorable aperture conditions or small length or with both these properties.

The objects of the invention are attained in that a reversible lens system is provided which has a limited focal length and which is so disposed behind the objective, *i. e.* the light admission lens in the path of nonparallel rays that its center of rotation coincides with the central point between its object-plane, *i. e.* the image plane of the objective and its own image plane and therefore has equal distance from both said planes and that the center of rotation is at the same time laterally displaced from the center between its two main planes.

In connection with optical systems having a reversible lens system for the change of magnification, there frequently exists a certain defect in that the reversible lens system requires a casing of undesired large dimensions at the place where the lens system is disposed. It is therefore important to arrange the reversible lens system in such a manner that it does not require a bulky form of casing. A suitable form of the reversible lens system results by composing it of a positive and a negative element and arranging it in such manner that the point lying in the middle between its nodal points is on an outer side of the reversible system while the center of rotation is between the two elements. If in such construction the object plane of the reversible system, *i. e.* the image plane of the objective is virtual, it is possible to dispose the reversible system quite close to the objective. This is advantageous especially for periscopes in that the reversible part is close to the entrance pupil of the instrument and may therefore have very small dimensions.

It is obvious that the reversible part of the instrument may be provided with two or more lens systems for the change of magnification, whose optical axes intersect each other, so that depending from the one or the other system being inserted in the path of rays, a repeated variation of the magnification is possible.

The invention is shown on the accompanying drawings on several constructional forms of telescopes.

Figure 1 represents a straight-sight telescope with two real image planes;

Fig. 2 represents a straight-sight telescope with a virtual and a real image plane;

Fig. 3 represents a telescope with a refracted axis and a virtual and a real image plane;

Fig. 4 is a modification of the reversing system used in the constructional form according to Fig. 3;

Fig. 5 represents a straight-sight telescope with two real image planes and two reversing systems adapted to be inserted in the path of rays.

In the telescope shown in Fig. 1, the objective is designated with the numeral 1; behind the objective is a diaphragm 2 on the object side of the reversing system composed of a negative element 3 and a positive element 4. The center between the main points of the reversing system is indicated at 5. The reversing system is provided within a separate casing 6 adapted to be turned about a shaft 7 located between the lenses 3, 4. At this point, the telescope casing 8 has an enlargement 9. 10 is the ocular. The diaphragm on the ocular side of the reversing system is indicated at 11. The axis of rotation 7 is equidistant from 2 and 11.

In the constructional form according to Fig. 2 the casing of the instrument is designated 8'; the part of the casing adapted to receive the reversing system is designated 6' and 9' is the enlargement of the casing. The objective, which in this case has negative focal length, is designated 1' and 3', 4' are the two elements of the reversing system. The virtual image plane of the negative objective is indicated at 2'; the image plane of the compound system formed by the objective and the reversing system is at 11'. The axis of rotation of the reversing system is indicated at 7' and the center between the two main points is indicated at 5'. 10' is the ocular and 12 another stationary reversing system, which casts the image into the image plane of the ocular.

In Fig. 3 the use of the system corresponding to Fig. 2 is shown on a telescope with two bends. The objective is designated 1''. The virtual image plane of the negative objective is indicated at 2''. The objective is directly followed by the reversing system 3'', 4'', which through the medium of a prism 13 produces between its two lenses a bend in the path of the rays. The reversing system 3'', 4'', 13 is mounted on a rotatable carrier 14, which is of such small dimensions that there is no enlargement of the instrument casing at this point. The carrier 14 is pivoted on the journal 15 so that the element 3'' or 4'' of the reversing system can be turned toward the objective. 16 is the collective element and 11'' the image plane on the ocular side of the reversible system. 10'' is the ocular which produces by means of the prism 18 between its collective element and its outer lens a second bend in the path of rays. 17 is a stationary reversing system arranged between the diaphragm 11'' and the ocular 10''. The reversing system 17 casts the image from 11'' toward the ocular.

The rotation of the carrier, containing the reversing system 3'', 4'' about the journal 15 may be replaced by a rotation about an axis vertical to the optical axes of the elements of the reversing system. In this case the elements of the reversing system must be doubled, as shown in Fig. 4, where the two sets of reversing systems are designated 3ª, 4ª, prism 13ª and 3ᵇ, 4ᵇ and prism 13ᵇ.

Fig. 5 is identical with the constructional form according to Fig. 1 except that two different reversing systems are provided in the part 6'''' of the casing, namely, the reversing systems 3ᶜ, 4ᶜ and 3ᵈ, 4ᵈ. Each of these reversing systems may be disposed in two positions in the path of rays of the instrument so that altogether four magnifications can be obtained.

What I claim is:—

1. Optical system comprising an objective, an ocular and a reversible system adapted to vary the magnification on reversal, the reversible system being composed of a positive and a negative element and so arranged that its fulcrum lies between its two elements and the center between its main points on one side, i. e. outside the reversible system.

2. Optical system comprising an objective of negative focal length, an ocular and a reversible system in close proximity to the objective adapted to vary the magnification of the system on reversal and so disposed that its fulcrum is equidistant from the image plane of the reversal system on its ocular side and from the virtual image plane of the objective.

In testimony whereof I have signed this specification in the presence of two subscribing witnesses.

Dr. MAX LANGE.

Witnesses:
 WOLDEMAR HAUPT,
 HENRY HASPER.